(12) United States Patent
Tanaglia

(10) Patent No.: US 6,211,332 B1
(45) Date of Patent: Apr. 3, 2001

(54) PROCESS FOR REDUCING THE MOLECULAR WEIGHT OF COPOLYMERS AND TERPOLYMERS OF ETHYLENE

(75) Inventor: Tiziano Tanaglia, Bologna (IT)

(73) Assignee: Enichem S.p.A., San Donato Milanese (IT)

( * ) Notice: Subject to any disclaimer, the term of this patent is extended or adjusted under 35 U.S.C. 154(b) by 0 days.

(21) Appl. No.: 09/466,793

(22) Filed: Dec. 20, 1999

(30) Foreign Application Priority Data

Dec. 22, 1998 (IT) .............................................. MI98A2774

(51) Int. Cl.⁷ ....................................................... C08F 6/00
(52) U.S. Cl. .............................................................. 528/490
(58) Field of Search ............................................... 528/490

(56) References Cited

U.S. PATENT DOCUMENTS

| | | | |
|---|---|---|---|
| 5,374,695 | 12/1994 | Tanaglia et al. | 526/125 |
| 5,491,209 | 2/1996 | Helmer et al. | 526/320 |
| 5,780,570 | 7/1998 | Tanaglia | 526/86 |
| 5,804,614 | 9/1998 | Tanaglia | 523/204 |
| 5,919,877 | 7/1999 | Tanaglia | 526/193 |

FOREIGN PATENT DOCUMENTS

| | | |
|---|---|---|
| 1 902 178 | 7/1970 | (DE) . |
| 36 42 266 | 4/1987 | (DE) . |
| 0 069 603 | 1/1983 | (EP) . |
| 0 074 194 | 3/1983 | (EP) . |
| 0 123 424 | 10/1984 | (EP) . |
| 0 264 156 | 4/1988 | (EP) . |
| 988846 | 4/1965 | (GB) . |

*Primary Examiner*—Terressa M. Boykin
(74) *Attorney, Agent, or Firm*—Oblon, Spivak, McClelland, Maier & Neustadt, P.C.

(57) ABSTRACT

Process for the reduction of the molecular weight of a polymeric material selected from EPM copolymer and EPDM terpolymer and relative mixtures, which comprises the treatment of the polymeric material with at least one hydroperoxide.

13 Claims, No Drawings

PROCESS FOR REDUCING THE MOLECULAR WEIGHT OF COPOLYMERS AND TERPOLYMERS OF ETHYLENE

The present invention relates to a process for reducing the molecular weight of copolymers and terpolymers of ethylene having an ethylene content not exceeding 20%, particularly ethylene-propylene (EPM) or ethylene-propylenediene (EPDM) elastomers.

The molecular weight reduction of EP(D)M by means of an operation downstream of the polymerization is a very advantageous technology for the preparation of polymers having low molecular weights and therefore low viscosities.

When evaluating the advantages of effecting the degradation of standard polymers to obtain polymers with the desired molecular weight, the difficulty of producing a high fluidity and consequently sticky polymer without any form stability, in an industrial plant, should be taken into account. The greater the elastomeric nature of the material, the more evident this becomes.

Various techniques are known in literature which allow depolymerization, i.e. the reduction of the molecular weight. In particular, thermo-oxidation, thermodegradation and degradation by means of radical initiators (peroxides), are used.

Thermo-oxidation (see for example U.S. Pat. No. 4,372,863) is a process carried out in the presence of oxygen (or air), which causes degradation by the combination of mechanical shear, temperature and the effect of oxygen. The known techniques mainly relate to the use of equipment in batch, long treatment times and machines only partially filled to guarantee a sufficient air flow. The resulting material is dark, oxidated and difficult to handle.

Thermo-mechanical degradation (see CA-A-991,792) is carried out at a very high temperature (about 330–400° C.), under nitrogen and preferably in extrusion; when operating under these thermal conditions, the radicals formed by mechanical shear and thermal stress do not have a sufficient life time to recombine.

The degradation reaction with peroxides is known and widely used in the field of polyalpha-olefins containing less than 20% approximately of ethylene (see for example CA-A-999,698). This is due to the instability of the radical on the tertiary carbon which prevents it from undergoing further cross-linking reactions which, on the contrary, are characteristic of EP(D)M and which are the basis of peroxide vulcanization reactions.

EP-A-123,424 describes a method for the degradation of olefinic polymers in the presence of a mixture essentially consisting of a peroxide and a hydroperoxide.

A process has now been found which allows an extremely strong acceleration in the degradation of the polymeric material, even at temperatures not exceeding 200° C., to be obtained.

In accordance with this, the present invention relates to a process for the reduction of the molecular weight of a polymeric material selected from EPM copolymer and EPDM terpolymer and relative mixtures, which comprises treatment of the polymeric material with at least one hydroperoxide, the above hydroperoxide being present in such a quantity as to cause a reduction in the molecular weight.

With respect to the EPM copolymers which can be used in the process of the present invention, these ethylene/propylene copolymers have a propylene molar content ranging from 16% to 50%, preferably from 20% to 45%, and an Mn ranging from 10,000 to 200,000.

With respect to EPDM, these are non-conjugated ethylene/propylene/diolefin terpolymers. Typical examples of non-conjugated diolefins are 1,4-hexadiene, 1,5-heptadiene, 1,6-octadiene, 1,4-cyclohexadiene, 5-methylene-2-norbornene, 5-ethylidene-2-norbornene. These EPDM terpolymers usually have an ethylene molar content ranging from 30 to 85%, preferably from 40 to 70%; from 15 to 70%, preferably from 30 to 60% molar, of propylene; from 0.5 to 20% molar, preferably from 1 to 15%, even more preferably from 2 to 10% molar of non-conjugated diene. The molecular weights Mn of EPDM are within the range of 15,000 to 200,000, preferably from 20,000 to 70,000 and the non-conjugated diene is preferably 5-ethylidene-2-norbornene.

The process for the preparation of EPDM in the presence of Ziegler-Natta catalysts is well known; see for example U.S. Pat. No. 2,933,589; U.S. Pat. No. 3,000,866; U.S. Pat. No. 3,093,621. These terpolymers are mainly produced as components for elastomeric compositions and are characterized by the absence of unsaturation in the main chain and by the presence of unsaturation sites in cyclic groups or groups lateral to the main chain.

In the process of the present invention, mixtures of polymers can also be used. Useful mixtures are mixtures of two or more EPM having a different ethylene content and/or different molecular weight.

The temperature at which the process of the present invention takes place ranges from 80° C. to 250° C., preferably from 140° C. to 200° C.

As far as the hydroperoxide (or mixture of hydroperoxides) is concerned, this is added to the EP(D)M as such or dissolved in a suitable solvent, preferably dissolved in a suitable solvent. The hydroperoxide should preferably have the characteristic of not undergoing significant decomposition at the process temperature. In other words, it is preferable for the hydroperoxide to have a half time which should not be less than the process time, even more preferably not less than 10 times the process time.

Typical examples of hydroperoxides are cumene hydroperoxide, hydrogen peroxide, t-butyl hydroperoxide, 2,5-dihydroperoxy-2,5-dimethylhexane. The concentration of hydroperoxide with respect to the EP(D)M ranges from 0.1 to 20% by weight, preferably from 0.2 to 10% by weight, even more preferably from 0.5% to 5% by weight.

In a preferred embodiment, the process of the present invention is carried out under high shear conditions, usually higher than 100 sec$^{-1}$, preferably higher than 1000 sec$^{-1}$.

The process of the present invention is preferably carried out in an extruder, even more preferably in a twinscrew extruder.

The process of the present invention is carried out without the introduction of oxygen and can be effected both in batch and in continuous. In the batch operation, the single components are added in a suitable reactor together or portion wise, in the presence of or without a solvent, preferably without a solvent. When operating in continuous, the reagents are added continuously, at a suitable feeding rate, to a reactor (or reactor zone) thermostat-regulated at the desired temperature.

The products which can be obtained with the process of the present invention can be applied in many fields, particularly in those which necessitate low molecular weights. Typical applications of these products are as viscosity modifiers in the engine oil-lubricant field, the modification of high fluidity plastic materials.

The following examples are provided for a better understanding of the present invention.

EXAMPLES

All the examples were carried out with the same polymer, a commercial EPM ENICHEM DUTRAL® CO 034 having 28% by weight of propylene.

The melt flow indexes (MFI) are effected according to the method ASTM D 1238. The MFI (E) is carried out at 190° C. and 2.16 kg, whereas the MFI (F) is carried out again at 190° C. but at 21.6 kg.

The above EPM had the following characteristics:
MFI (E) =0.56 g/10 min.
MFI (F) =12.5 g/10 min.
MWD =2.9
Mw =138,000

The t-butyl hydroperoxide (TBHP) used was supplied by Akzo Nobel at 70% in an aqueous solution (trade-name Trigonox® AW70).

The dicumyl peroxide (DCP) used was supplied by Akzo Nobel Chem. At 40% on an inert product (trade-name Perkadox® 40).

Comparative Example 1

A 70 cc mixing chamber is charged with 40 grams of polymer, thermostat-regulated at 135° C. (external) and maintained under mixing at 30 revs/min. A temperature of 147° C. is reached at equilibrium. The product is left to plastify for 2 seconds, the rotor rate is then suddenly increased to 195 revs/min; the temperature rises and the torque moment measured by the instrument slowly decreases. After 3 minutes of mastication, the experiment is interrupted and the product, which has the following characteristics, is recovered:
MFI (E) =1.3 g/10 min.
MFI (F) =31.2 g/10 min.

Example 2

The 70 cc mixing chamber of example 1 is charged with 40 grams of polymer and 1% of t-butyl hydroperoxide, and then thermostat-regulated at 135° C. (external) and maintained under mixing at 30 revs/min. A temperature of 146° C. is reached at equilibrium. The product is left to plastify for 2 seconds and the rotor rate is then suddenly increased to 195 revs/min. The temperature rises and the torque moment measured by the instrument decreases much more rapidly with respect to the test of comparative 1. After 2 minutes of mastication, the experiment is interrupted, the product is cooled and recovered. The product has the following characteristics:
MFI (E) =2.4 g/10 min.
MFI (F) =83.5 g/10 min.

Comparative Example 3

The 70 cc mixing chamber of example 1 is charged with 40 grams of polymer and 3% of dicumyl peroxide (equimolar with 1% of t-butyl hydroperoxide), and then thermostat regulated at 135° C. (external) and maintained under mixing at 30 revs/min. A temperature of 146° C. is reached at equilibrium. The product is left to plastify for 2 seconds and the rotor rate is then suddenly increased to 195 revs/min. At this point the temperature rises and the torque moment measured by the instrument rapidly increases indicating the cross-linking in process. In addition there is a considerable volume expansion and the discharge of the cross-linked polymer in unmoldable powder.

The above comparative test demonstrates that peroxides are not effective in the process of the present invention.

Comparative Example 4

The 70 cc mixing chamber of example 1 is charged with 40 grams of polymer and 1% of dicumyl peroxide (equimolar with 1% of t-butyl hydroperoxide), and then thermostat regulated at 135° C. (external) and maintained under mixing at 30 revs/min. A temperature of 146° C. is reached at equilibrium. The product is left to plastify for 2 seconds and the rotor rate is then suddenly increased to 195 revs/min. At this point the temperature rises and the torque moment measured by the instrument, instead of decreasing, has an oscillating movement, reaching a second torque maximum about 1 minute after the rate increase. After about 3 minutes of mastication, the experiment is interrupted, the product is cooled and recovered. The product has the following characteristics:
MFI (E) =does not extrude
MFI (F) =7.5 g/10 min.

This example also clearly demonstrates that peroxide is not effective in the process of the present invention.

Comparative Example 5

The 70 cc mixing chamber is charged with 40 grams of polymer, 1% of dicumyl peroxide and 3% of t-butyl hydroperoxide, thermostat-regulated at 135° C. (external) and maintained under mixing at 20 revs/min. A temperature of 1450° C. is reached at equilibrium. The product is left to plastify for 2 seconds and the rotor rate is then suddenly increased to 195 revs/min. The temperature rises and the torque moment measured by the instrument decreases. After 3 minutes of mastication, the experiment is interrupted, the product is cooled and recovered. The product has the following characteristics:
MFI (E)=0.12 g/10 min.
MFI (F)=16.5 g/10 min.

TABLE 1

| Nr. | Time Min. | DCP % wt | BHP % wt | MFI (E) | MFI (F) | Mw | MWD |
|---|---|---|---|---|---|---|---|
| As such | — | — | — | 0.56 | 12.5 | 138,000 | 2.9 |
| 1c | 3 | 0 | 0 | 1.3 | 31.2 | 107,000 | 2.9 |
| 2 | 2 | 0 | 1 | 2.4 | 83.5 | 84,000 | 2.6 |
| 3c | — | 3 | 0 | — | — | — | — |
| 4c | 3 | 1 | 0 | *** | 7.5 | 142 | 4.6 |
| 5c | 3 | 1 | 3 | 0.12 | 16.5 | 129 | 4.9 |

A comparison of examples 1 and 2 demonstrates the effectiveness of the process of the present invention. In fact, the degraded polymer of example 2 has a lower molecular weight and a narrower molecular weight distribution with respect to the reference example (1c).

On comparing examples 3 and 4 with example 2, it can be seen how the effectiveness of the process of the present invention is due to the presence of the hydroperoxide. In fact, the presence of peroxide instead of hydroperoxide does not cause an effective degradation of the polymer.

Finally, also the combined use of peroxide+ hydroperoxide (comparative example 5c) gives poorer results than the use of hydroperoxide alone in example 2.

It should finally be pointed out that example 2 according to the present invention allows much higher performances to be obtained, even though the mastication time is less (2 minutes) with respect to the time of the other tests (3 minutes).

What is claimed is:

1. A process for the reduction of the molecular weight of a polymeric material, comprising treating the polymeric material with at least one hydroperoxide, said hydroperoxide being present in a quantity sufficient to affect the molecular weight reduction;

wherein the temperature ranges from 80° C. to 250° C.; and wherein said polymeric material is selected from the group consisting of EPM polymer having a propylene molar content ranging from 16 to 50%, EPDM and a mixture thereof.

2. The process according to claim 1, wherein the ethylene/propylene copolymers have a molar content of propylene ranging from 16% to 50% and an $M_n$, ranging from 10,000 to 200,000.

3. The process according to claim 2, wherein the ethylene/propylene copolymers have a molar content of propylene ranging from 20% to 45%.

4. The process according to claim 1, wherein the temperature ranges from 140° C. to 200° C.

5. The process according to claim 1, wherein the EPDM have a molar content of ethylene ranging from 30 to 85%; of propylene ranging from 15 to 70%; of nonconjugated diene ranging from 0.5 to 20%, the molecular weights $M_n$, of the EPDM being within the range of 15,000 to 200,000.

6. The process according to claim 5, wherein the ethylene ranges from 40 to 70% molar; the propylene ranges from 30 to 60% molar; the non-conjugated diene from 1 to 15% molar.

7. The process according to claim 5, wherein the $M_5$, of the EPDM range from 20,000 to 70,000.

8. The process according to claim 6, wherein the non-conjugated diene ranges from 2 to 10% molar.

9. The process according to claim 1, wherein the concentration of hydroperoxide with respect to the EP(D)M ranges from 0.1 to 20% by weight.

10. The process according to claim 9, wherein the concentration of hydroperoxide with respect to the EP(D)M ranges from 0.2 to 10% by weight.

11. The process according to claim 10, wherein the concentration of hydroperoxide with respect to the EP(D)M ranges from 0.5 to 5% by weight.

12. The process according to claim 1, characterized in that the process is carried out under shear conditions higher than 100 $sec^{-1}$.

13. The process according to claim 12, wherein said process is carried out under shear conditions higher than 1,000 $sec^{-1}$.

* * * * *